(12) United States Patent
Beverly et al.

(10) Patent No.: US 7,437,920 B2
(45) Date of Patent: Oct. 21, 2008

(54) TIRE INFLATION METHOD

(75) Inventors: James A. Beverly, Kalamazoo, MI (US);
Stephen P. Claussen, Richland, MI
(US); Daryl J. Stacer, Portage, MI (US)

(73) Assignee: Dana Heavy Vehicle Systems Group, LLC, Toledo, OH (US)

( * ) Notice: Subject to any disclaimer, the term of this patent is extended or adjusted under 35 U.S.C. 154(b) by 36 days.

(21) Appl. No.: 11/523,165

(22) Filed: Sep. 19, 2006

(65) Prior Publication Data

US 2008/0066533 A1    Mar. 20, 2008

(51) Int. Cl.
*G01M 17/02*    (2006.01)
(52) U.S. Cl. ..................... 73/146.2; 152/417
(58) Field of Classification Search ............... 73/146.2; 152/417; 340/442
See application file for complete search history.

(56) References Cited

U.S. PATENT DOCUMENTS

| | | | |
|---|---|---|---|
| 5,071,259 A * | 12/1991 | Metzger et al. ............. | 374/143 |
| 5,179,981 A | 1/1993 | Hicks | |
| 5,180,456 A | 1/1993 | Schultz | |
| 5,253,687 A | 10/1993 | Beverly | |
| 5,273,064 A | 12/1993 | Beverly | |
| 5,313,995 A | 5/1994 | Schultz | |
| 5,516,379 A | 5/1996 | Schultz | |
| 6,561,017 B1 | 5/2003 | Claussen | |
| 6,604,414 B1 | 8/2003 | Claussen | |
| 6,666,078 B1 | 12/2003 | Claussen | |
| 6,758,088 B2 | 7/2004 | Claussen | |
| 6,865,930 B1 | 3/2005 | Claussen | |
| 6,868,719 B1 | 3/2005 | Claussen | |
| 6,894,607 B1 | 5/2005 | Claussen | |
| 7,265,659 B2 * | 9/2007 | Claussen et al. ............ | 340/442 |
| 2004/0016492 A1 | 1/2004 | Moore | |
| 2005/0194080 A1 | 9/2005 | White | |
| 2006/0018766 A1 | 1/2006 | Stanczak | |
| 2006/0053876 A1 | 3/2006 | Claussen | |

* cited by examiner

*Primary Examiner*—Andre J Allen
(74) *Attorney, Agent, or Firm*—Marshall & Melborn LLC

(57) ABSTRACT

A tire inflation method is disclosed for moving air through a fluid control circuit to at least one tire that is below a target pressure. The dynamic pressure of the moving air in the fluid control circuit is monitored. A pressure control valve in the fluid control circuit is cycled on and off to prevent the dynamic pressure from reaching a predetermined amount over the target pressure.

10 Claims, 3 Drawing Sheets

TIRE INFLATION METHOD

FIELD OF THE INVENTION

The present invention relates to a method to inflate tires of a vehicle.

BACKGROUND OF THE INVENTION

Tire inflation methods, also known as on-board inflation methods and traction methods, are well known, as may be seen by reference to the following U.S. patent Nos.: U.S. Pat. Nos. 5,516,379; 5,313,995; 5,273,064; 5,253,687; 5,180,456; 5,179,981; 5,174,839; 5,121,774; 4,924,926; 4,922,946; 4,917,163; 4,893,664; 4,883,106; 4,883,105; 4,825,925; 4,782,879; 4,754,792; 4,724,879; 4,678,017; 4,640,331; and 4,619,303. The entire disclosures of each of these patents are incorporated herein.

Typically, such systems comprise a source of pressurized fluid, a circuit leading from the source of pressurized fluid to the tires of a vehicle and a means to control the amount of fluid flowing from the source to the tires.

The prior art systems can be disadvantageous because often they have no means to prevent the highly pressurized fluid from the source reaching tires that do not need to be inflated. This can result in the incremental over inflation of tires that are already at their target or desired pressure. Over time, this can raise tire pressures close to the pressure of the source of fluid. Generally, over inflated tires are undesirable since they wear more quickly, they can change the ride characteristics of the vehicle and they are prone to failure. Tire failure can be catastrophic for a vehicle.

One example of a prior art system for inflating the tires of a vehicle is described in U.S. Patent Application Publication No. US 2005/0194080 which teaches a tire inflation system that provides short bursts of air of 0.033 to 0.065 seconds to a tire whose pressure is below a target inflation pressure. Once a burst of air is sent to the tire, a controller waits for a brief period of time for the system to stabilize. A delivery pressure transducer permits the controller to determine if the pressure reading is equal to or above the target inflation pressure after the burst is delivered. If the target inflation pressure has not been reached, the process is repeated with a larger burst of air. It is disclosed that the air supply source, which provides the burst of air, is kept at approximately 120 psi. It can be appreciated that providing larger and larger bursts of highly pressurized air can result in the over inflation of tires that do not need additional air since typically the under inflated tire or tires cannot accept all the air provided in such a high pressure burst.

U.S. Pat. No. 6,561,017 teaches a system that inflates a tire over a target pressure. The dynamic inflation is stopped and a static pressure is determined. If needed, short pulses of compressed air may be provided to close the gap between the static pressure and the target pressure. This patent also fails to disclose means to prevent the pulses of compressed air from reaching one or more tires that do not need to be inflated.

SUMMARY OF ONE EMBODIMENT OF THE INVENTION

The present invention is directed toward increasing the pressure in one or more tires of a vehicle. The preferred method comprises monitoring the dynamic pressure of air flowing through a fluid control circuit to one or more tires of a vehicle that are below a target pressure. When the dynamic pressure reaches a predetermined amount over the target pressure, a valve stops the flow of air. The air introduced into the fluid control circuit is permitted to flow toward the one or more tires. The valve opens again and, when the dynamic pressure builds to the predetermined amount, the valve again closes. The above steps are rapidly repeated so that one or more tires below the target pressure are inflated, but tires already at the target pressure are not inflated.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
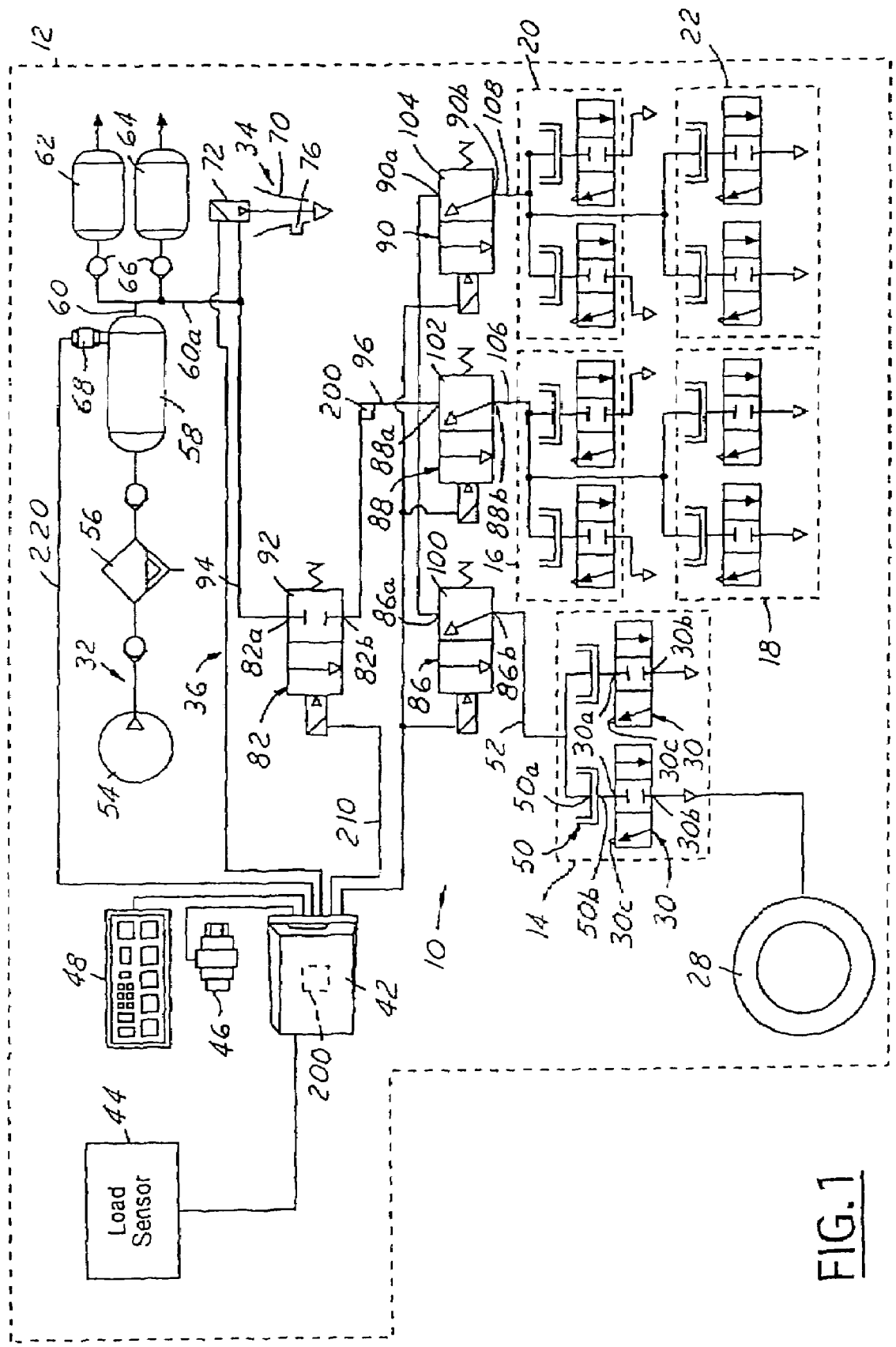
FIG. 1 is a diagrammatic view of one embodiment of a tire pressure management system for a vehicle, a vehicle incorporating the same being shown in dotted lines.

FIG. 1 shows a tire pressure management system 10 for a vehicle 12 for describing, but not limiting applicability of the invention. Vehicle 12 may be, but is not limited to being a tractor-trailer. The system may also be used in connection with a wide variety of vehicles, including just trailers of tractor-trailer combinations, automobiles, and off-road vehicles.

Figure 2:
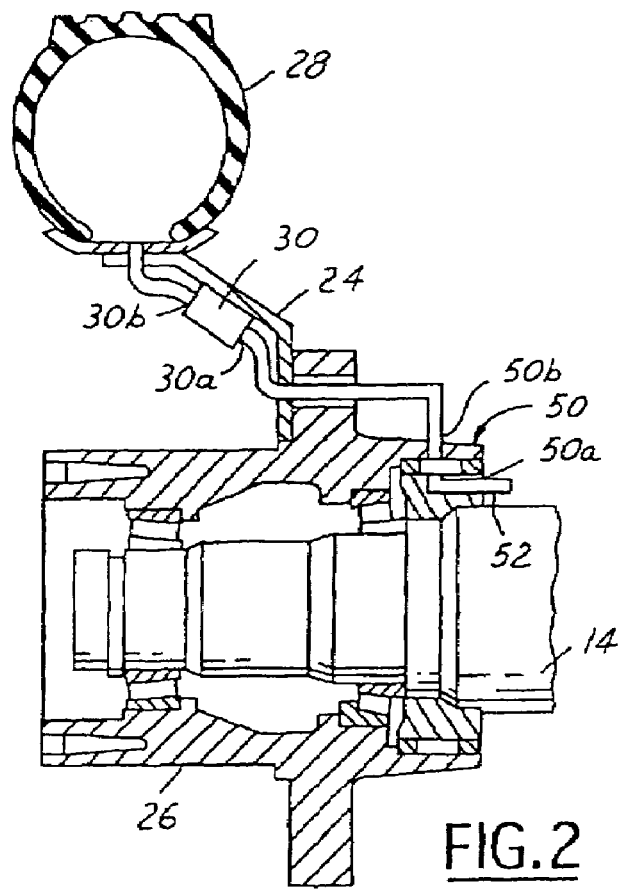
FIG. 2 is a cross-sectional detail view of one embodiment of a convention vehicle wheel assembly.

Vehicle 12 may include a plurality of axles, including a steer axle 14, a tandem axle assembly having drive axles 16, 18 and another tandem axle assembly having trailer axles 20, 22. As shown in greater detail in FIG. 2, each axle, such as drive axle 14, may include wheels 24 affixed to wheel hubs 26 disposed at each outboard end of the axle and rotationally supported on axle 14. Each wheel 24 may include one or more inflatable tires 28 mounted thereon.

System 10 monitors and controls pressure within each tire 28 of vehicle 12. System 10 may include wheel valve assemblies 30, a fluid source 32, and a fluid control circuit 36. System 10 may further include at least a sensor 200, one or more electronic control units 42, one or more load sensors 44, a speed sensor 46, and an operator control device 48.

Wheel valve assemblies 30 are provided to control the flow of pressurized fluid into and out of tires 28. Valve assembly 30 is mounted to each end of each axle and is connected to the remainder of system 10 through a rotary seal connection 50. Wheel valve assembly 30 is conventional and may include the wheel valve assembly described and illustrated in U.S. Pat. No. 5,253,687 or U.S. Pat. No. 6,250,327, the entire disclosures of which are incorporated herein.

Rotary seal assembly 50 also is conventional and may include the rotary seal assembly described and illustrated in U.S. Pat. No. 5,174,839, the entire disclosure of which also is incorporated herein.

Referring again to FIG. 2, wheel valve assembly 30 may include an inlet port 30a coupled to a rotatable port 50b of rotary seal assembly 50, an outlet port 30b in fluid communication with the interior of tire 28, and an exhaust port 30c, best shown in FIG. 1. Rotary seal assembly 50 may further include a non-rotatable port 50a connected to a conduit 52 of fluid control circuit 36. Valve assembly 30 assumes a closed position, as illustrated in FIG. 1, when the fluid pressure at inlet port 30a is substantially atmospheric, an open position connecting inlet port 30a and outlet port 30b when the fluid pressure at inlet port 30a is a positive pressure, and an exhaust position connecting outlet port 30b and exhaust port 30c when the fluid pressure at inlet port 30a is a negative pressure. It should be appreciated that valve assembly 30 may or may not have the exhaust position as the present invention works equally well with the exhaust position or without the exhaust position.

Fluid source 32 provides positive pressurized fluid to system 10 and tires 28. Fluid source 32 is conventional and may include a pressure source, such as a pump 54, an air dryer 56, and a first fluid tank 58 connected via a conduit 60 to the brake system fluid tanks 62, 64 and to the fluid control circuit 36 via a branch conduit 60a. Check valves 66 prevent sudden loss of fluid pressure in-brake tanks 62, 64 in the event of upstream pressure loss.

Fluid control circuit 36 directs the flow of pressurized fluid within system 10 for controlling pressure in tires 28 of vehicle 12. Control circuit 36 may include a pressure control valve 82 and a plurality of axle distribution valves 86, 88, 90. As shown, a single fluid control circuit 36 controls pressure in all of the tires 28 of vehicle 12. However, control circuit 36, and other portions of system 10, may be replicated so that, for example, one control circuit 36 may control tire pressures in the tractor portion of vehicle 12 and another control circuit 36 may control tire pressure in the trailer portion of vehicle 12. Further, the present invention works equally well on just the trailer portion of the vehicle 12 with no associated portion on the tractor or a different tire inflation structure on the tractor.

Pressure control valve 82 directs pressurized fluid from fluid source 32 to tires 28 of vehicle 12. Valve 82 may include a conventional two position-two way, solenoid controlled and pilot fluid operated valve. Valve 82 includes a valving member 92 that is preferably spring biased toward a closed position, as shown in FIG. 1. Valving member 92 assumes an open position in response to energizing of a solenoid operatively associated therewith via control signals from electronic control unit 42. Valve 82 preferably has a first port 82a coupled to a conduit 94 leading to fluid source 32. Valve 82 preferably has a second port 82b coupled to another conduit 96 leading to axle distribution valves 86, 88, 90.

Axle distribution valves 86, 88, 90 limit the supply of positive pressurized fluid to, or the release of fluid from, the tires 28 of one or more axles 14, 16, 18, 20, 22 of vehicle 12. Valves 86, 88, 90 are conventional and may include two position-two way, solenoid controlled and pilot fluid operated valves. Valves 86, 88, 90 direct the flow of fluid to and from the tires 28 of axles 14, 16 and 18, and 20 and 22, respectively. Each of valves 86, 88, 90 preferably includes a valving member 100, 102, 104, respectively, that is spring-biased toward a closed position, as shown in FIG. 1, and which assumes an open position in response to energizing a solenoid operatively associated therewith via electrical signals from electronic control unit 42.

Each of valves 86, 88, 90 respectively preferably has first ports 86a, 88a, 90a coupled to conduit 96. Each of valves 86, 88, 90 respectively preferably has second ports 86b, 88b, 90b leading to respective corresponding conduits 52, 106, 108 for each axle or tandem axle of vehicle 12. When valves 86, 88, 90 are opened, fluid is permitted to flow toward and into tires 28. When valves 86, 88, 90 are closed, fluid is restricted from tires 28 and vented to the atmosphere.

Although axle distribution valves 86, 88, 90 are shown, individual tire distribution valves could be used in conjunction with axle distribution valves 86, 88, 90 or as an alternative to axle distribution valves 86, 88, 90 to further control the flow of fluid to and from individual tires 28 of vehicle 12. Further, although only three axle distribution valves 86, 88, 90 are shown, the number of axle distribution valves may be varied depending upon the number of axles of vehicle 12 and to allow for greater individual control of the tires 28 of vehicle 12.

Figure 4:
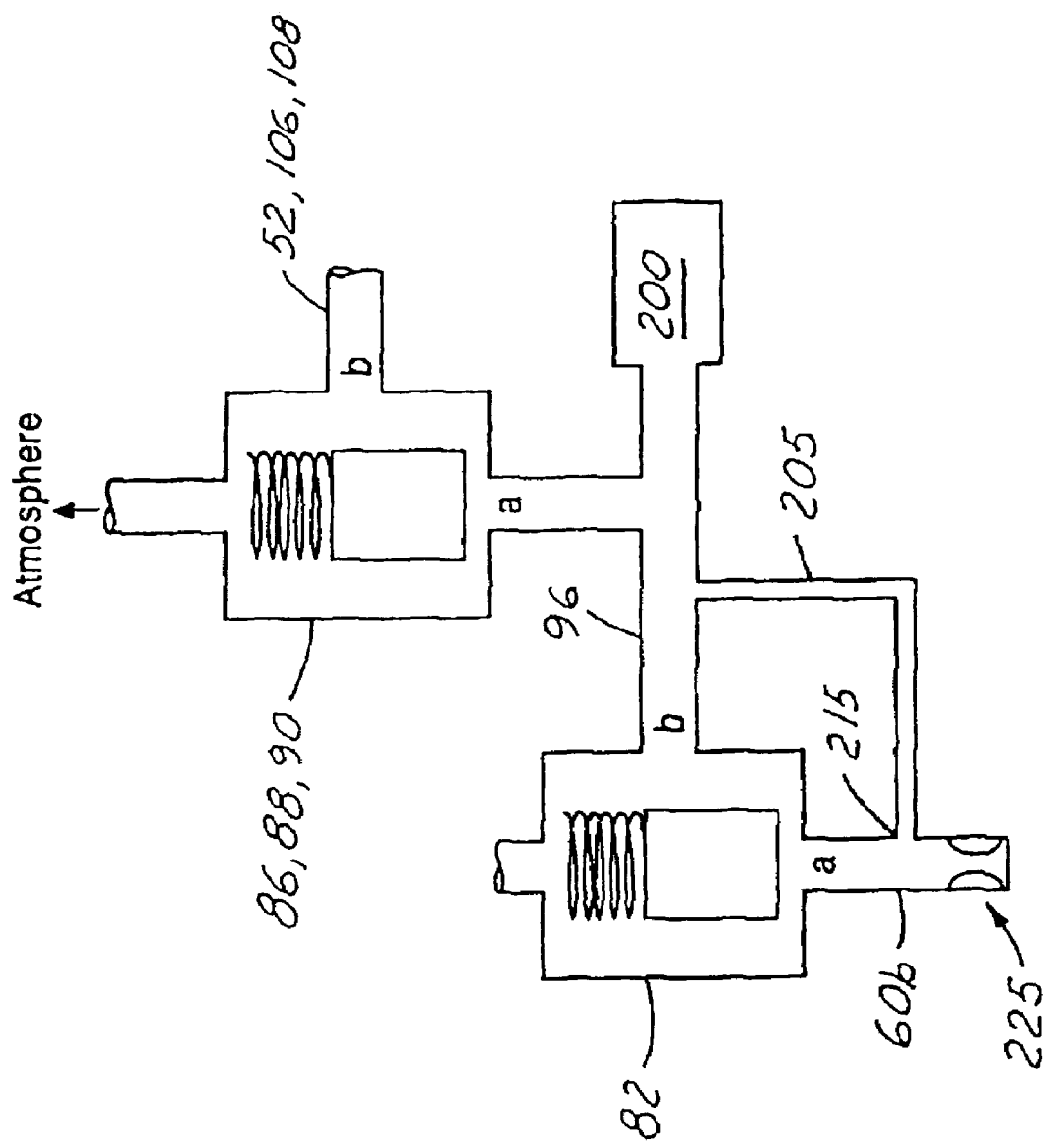
FIG. 4 is a schematic view of one embodiment of a tire pressure management system configured according to the invention.

Referring to FIGS. 1 and 4, sensor 200 may be electrically integrated with electronic control unit 42. Sensor 200 is disposed in fluid communication with conduit assemblies for conducting fluid from fluid source 32 and to and/or from tires 28. Preferably, sensor 200 is disposed in conduit 96 between valve 82 and valves 86, 88 and 90. However, sensor 200 may be located anywhere downstream of the valve 82, including, for example, at the tires 28.

When valve 82 is open and any of valves 86, 88, and 90 are open, fluid flows from fluid source 32 to tires 28, and sensor 200 may measure a dynamic pressure associated therewith. When valve 82 is open and valves 86, 88 and 90 are closed, assuming equilibrium conditions exist, sensor 200 may sense a pressure of fluid available in fluid source 32. When valve 82 is closed and one of valves 86, 88 and 90 is open, assuming equilibrium conditions exist, sensor 200 may sense a pressure of fluid in a tire 28 associated with the open one of valves 86, 88 and 90. Thus, one sensor 200 is able to measure the fluid pressure of fluid source 32 and tires 28.

Sensor 200 may transmit a parameter signal indicative of a measured parameter associated with the fluid pressure in fluid source 32 and a tire 28 of vehicle 12. The parameter may correspond to fluid pressure or another attribute, such as temperature, that may be indicative of pressure.

One embodiment of the device described thus far also provides for compensating for fluid, hence fluid pressure, losses occasioned through valve or line leaks, such as from valve 82 or conduit 96. Such leaks are commonplace and, if not serious, not worth the expense of repairing same. Once a leak attains a critical stage, when the leak allows a substantial amount of fluid to escape, such may justify economically tearing down the tire pressure maintenance system to repair or replace parts thereof. However, until reaching the critical stage, supplementing the conduit assemblies with compressed fluid is an economically viable alternative.

Accordingly, as shown in FIG. 4, the invention may include a bleed air line 205 connected between and fostering continuous fluid communication between conduit 60a, which conducts fluid from fluid source 32 to valve 82, and conduit 96, which conducts fluid from valve 82 to valves 86, 88, and 90. Bleed air line 205 bypasses, therefore flow therethrough is not influenced by, valve 82. Alternatively, bleed air line 205 may have an end 215 connected, not to conduit 60a as shown, but to any other conduit continuously pressurized by fluid source 32.

As shown in FIG. 4 conduit 60a may have a restriction 225. Preferably, restriction 225 defines a passage that is 0.040 inches in diameter. Restriction 225 restricts flow through conduit 60a to an amount of fluid sufficient to open one valve assembly 30. Restriction 225 prevents unintentional inflation of a tire 28 in fluid communication with a conduit assembly for conducting fluid to a tire 28 selected for inflation. Thus, the restricted fluid flow in conduit 60a would have sufficient pressure to trigger opening the valve assembly 30 for the tire 28 targeted for inflating, but insufficient pressure to trigger opening of other valve assemblies 30.

Figure 3:
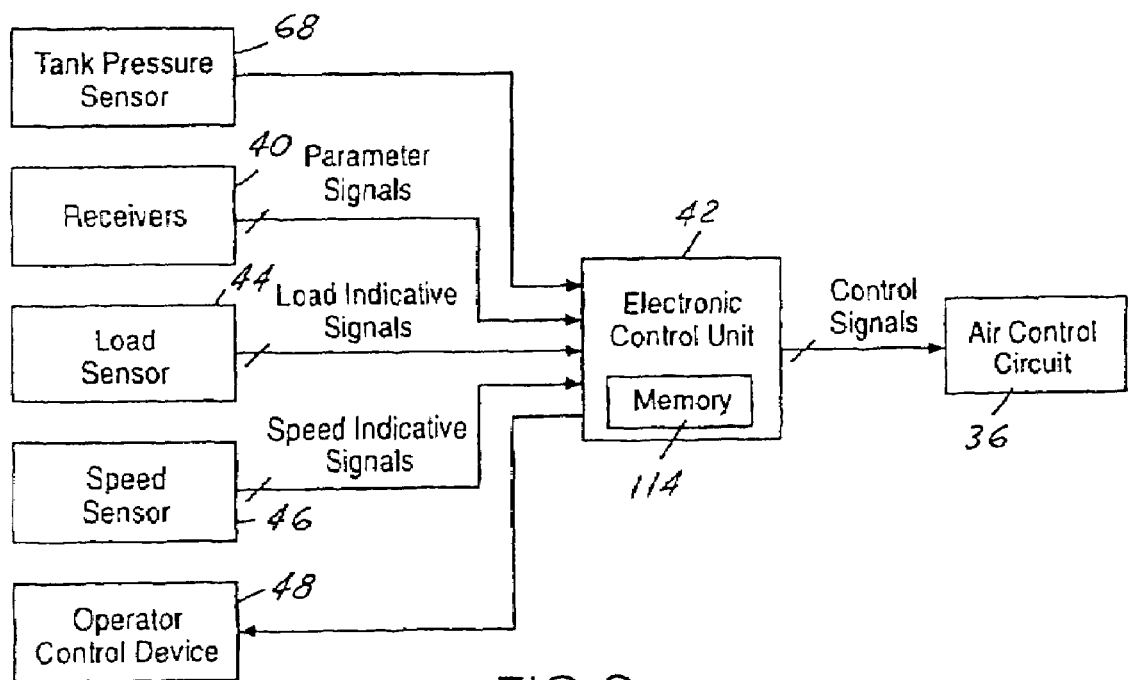
FIG. 3 is a schematic view of components that may be associated with the system of FIG. 1.

Referring to FIG. 3, electronic control unit 42 preferably controls fluid control circuit 36. Control unit 42 may include a microprocessor operating under the control of a set of programming instructions commonly referred to as software. Electronic control unit 42 may include a memory 114 in which the programming instructions are stored. Memory 114 also may contain identification codes for each tire 28 of vehicle 12 to uniquely identify the particular tire 28 to which a particular parameter signal corresponds. Memory 114 also may be used to record tire pressure values or user inputs over a period of time to assist in evaluating tire pressure management.

Control unit 42 may receive input signals from sensor 200, one or more load sensors 44, speed sensor 46, and operator control device 48. Control unit 42 outputs a plurality of control signals to control valves 82, 86, 88, 90 of fluid control circuit 36. Control unit 42 also may generate a plurality of output signals to a display device which may include a part of operator control device 48 or a freestanding device. The latter signals may be used to trigger the display pressure readings and/or deflection levels for each vehicle tire 28, the load on vehicle 12 or a portion of it, and the speed of vehicle 12. The signals may also be used to trigger warnings to the operator of vehicle 12 in the event that pressure cannot be maintained in one of the vehicle tires 28, the pressure exceeds or falls below predetermined maximum and minimum tire pressure values, or the pressure differs from a target tire pressure value by more than a predetermined amount.

Load sensors 44, if any, provide an indication as to the load on vehicle 12 and, consequently, tires 28 of vehicle 12, or the load on some portion of vehicle 12 and, consequently, select tires 28 of vehicle 12. Load sensors 44 are conventional and load sensing may be provided in a variety of known ways, including through analysis of pneumatic pressure in the suspension of vehicle 12, analysis of powertrain parameters, the use of displacement transducers, or the implementation of load beams and strain gauges. Each load sensor 44 may provide one or more signals to electronic control unit 42 indicative of the load bearing on vehicle 12 or a portion thereof.

Electronic control unit 42 may initiate pressure adjustment in tires 28 of vehicle 12 in response to signals from load sensors 44 in a variety of ways. For example, electronic control unit may cause an increase or decrease in the pressure in one or more tires 28 responsive to a corresponding increase or decrease in vehicle load based on a variety of linear or non-linear functions. One or more tire deflection tables may be stored in a memory, such as memory 114, and accessed by electronic control unit 42 responsive to the signals from load sensors 44.

Speed sensor 46, if any, measures the speed of vehicle 12 to further control deflection levels for tires 28. High deflection levels can create safety concerns and reduce tire life if maintained while vehicle 12 is operating at relatively high speeds. Speed sensor 46 is conventional in the art and provides a signal to electronic control unit 42 corresponding to speed.

Operator control device 48 may allow the operator of vehicle 12 to exert at least some level of control over system 10. Device 48 is conventional in the art and may include a plurality of input/output devices, such as a keypad, touch screen, switches or similar input devices, and a display screen, sound generator, lights or similar output devices. Thus, device 48 permits an operator of vehicle 12 to transmit control signals to electronic control unit 42 to adjust pressure levels within the tires 28 of vehicle 12. The control signals may, for example, correspond to deflection levels for tires 28 of vehicle 12. As a result, the operator is able to adjust the deflection level of the tires 28 to correspond to the terrain over which vehicle 12 is traveling. Such control is desirable to provide improved floatation and traction on certain terrain.

Sensor 200 preferably substantially continuously monitors the pressure in tires 28 via the system described above. It should be appreciated, however, that it is within the scope of the present invention for the sensor 200 to monitor the pressure in the tires 28 on a non-continuous basis, such as at timed or at random intervals. When a pressure of one or more tires is detected that is below a target pressure for the tires 28, the sensor signals the electronic control unit 42. Target pressure, as used herein, means the final tire pressure desired during steady state operations of a vehicle.

By way of example only, a target pressure for a tire may be approximately 100 psi. Those skilled in the art will appreciate that the target pressure will vary depending on the type of tire, the type of vehicle the tire is used on and how the vehicle is being used at a particular time, thus the present invention should not be limited to only the exemplary disclosed target pressure.

The electronic control unit 42 signals the pressure control valve 82 to open when a pressure of one or more tires 28 is below the target pressure. Valve 82 opens and air from the brake system fluid tanks 62, 64 begins to flow to axle distribution valves 86, 88, 90. It should be appreciated that the present invention works equally well when air is supplied to the fluid control circuit 36 by other means other than brake system fluid tanks 62, 64. For example, the air may be supplied directly to the circuit 36 from the pump 54 or from any air storage device.

The air provided to the fluid control circuit 36, regardless of where it comes from, is typically higher than the target pressure. By way of example only, the brake system fluid tank pressure may be approximately 125 psi to approximately 130 psi. Again, those skilled in the art will appreciate that the brake system fluid tank pressure can be more or less depending on the size of the fluid source 32 and/or the tanks 58, 62, 64, and/or the size of the pump 54, among other factors.

Those skilled in the art appreciate that the dynamic air pressure at sensor 200 gradually begins to build after valve 82 opens. Preferably, the dynamic air pressure at sensor 200 is permitted to build to a predetermined amount over the target pressure. By way of example only, the dynamic air pressure is permitted to exceed the target pressure by approximately 5 psi. Thus, in this particular example, the dynamic pressure is permitted to rise to approximately 105 psi. The rising dynamic pressure is conveyed substantially continuously back to the electronic control unit 42. At 105 psi, the electronic control unit 42 signals the pressure control valve 82 to close. It can be appreciated that the dynamic pressure rises to the predetermined amount over the target pressure relatively quickly. However, as disclosed above, the dynamic pressure at sensor 200 is not permitted to approach the pressure in the brake system 62, 64.

The static pressure in the system 10 is determined at sensor 200. As the air just delivered to the system 10 flows to tires 28 that were below the target pressure, the pressure sensed at sensor 200 will begin to drop. When the pressure at sensor 200 drops below the target pressure, the electronic control unit 42 is signaled which in turn signals the pressure control valve 82 to open. The valve 82 opens again and air from the brake system fluid tanks 62, 64, or from any source, begins to flow to axle distribution valves 86, 88, 90.

The dynamic air pressure at sensor 200 again begins to build after valve 82 opens. The dynamic air pressure at sensor 200 is permitted to build to the predetermined amount over the target pressure. At the predetermined amount over the target pressure, the electronic control unit 42 signals the pressure control valve 82 to close.

The above-described process is preferably repeated a plurality of times a second, although it can be repeated at any interval. It can be thus appreciated that by modulating the pressure control valve 82 as described above, the high pressure differential between the pressure in the brake system fluid tanks 62, 64, or any fluid source, and the pressure in the tires 28 is minimized and the tires, whether they are over inflated or under inflated are not exposed to a pressure above the predetermined amount over the target pressure. Minimizing the high pressure differential substantially reduces the potential for incrementally pressurizing tires 28 that are already at the target pressure with bursts of high pressure fluid while trying to raise the pressure in other tires 28 that are below the target pressure.

When the sensor 200 is not sensing the dynamic pressure, it senses the pressure at the tires 28. If the pressure at the tires 28 is approximately that of the target pressure, the modulation process described above stops until the pressure at the tires 28 drops below the target pressure.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A tire inflation method, comprising:
   providing a source of fluid and at least one tire at a pressure below a target pressure for said at least one tire and a fluid control circuit connecting said source of fluid with said at least one tire;
   flowing fluid into said fluid control circuit from said source of fluid;
   monitoring an increasing dynamic pressure in said fluid control circuit; and
   modulating a pressure control valve in said fluid control circuit based on said monitored dynamic pressure while said fluid is flowing to prevent said dynamic pressure from increasing beyond a predetermined amount over said target pressure.

2. The method of claim 1, wherein a pressure sensor is located downstream of said pressure control valve to alternatingly sense said increasing dynamic pressure in said fluid control circuit and static pressure in said at least one tire.

3. The method of claim 2, wherein said pressure sensor senses said increasing dynamic pressure in said fluid control circuit and signals an electronic control unit, said electronic control unit modulating said pressure control valve by signaling it to close when said dynamic pressure reaches said predetermined amount over said target pressure and signaling said pressure control valve to open when said pressure sensor senses that the pressure in said at least one tire is below said target pressure.

4. The method of claim 3, wherein said pressure control valve is opened and closed a plurality of times a second during said modulation.

5. A tire inflation method, comprising:
   moving air through a fluid control circuit to at least one tire that is below a target pressure;
   monitoring the dynamic pressure of said moving air in said fluid control circuit;
   cycling a pressure control valve in said fluid control circuit on and off to prevent the dynamic pressure of said moving air from reaching a predetermined amount over said target pressure.

6. The method of claim 5, wherein cycling said pressure control valve introduces air at a predetermined dynamic pressure into said fluid control circuit so said air substantially flows to said at least one tire below said target pressure and not into tires at said target pressure.

7. A tire inflation method, comprising:
   a. providing a fluid control circuit that connects a source of fluid to at least one tire on a vehicle;
   b. providing a pressure control valve located in said fluid control circuit;
   c. flowing fluid from said source of fluid through said pressure control valve to said fluid control circuit;
   d. monitoring an increasing dynamic pressure of said flowing fluid downstream from said pressure control valve; and
   e. modulating said pressure control valve a plurality of times a second as said fluid flows to prevent said dynamic pressure from exceeding a predetermined amount over a target pressure for said at least one tire.

8. The tire inflation method of claim 7, further comprising utilizing a pressure sensor downstream of said pressure control valve to determine if said at least one tire is below a target pressure.

9. The tire inflation method of claim 7, wherein said dynamic pressure downstream of said pressure control valve does not exceed a pressure of said source of fluid.

10. The tire inflation method of claim 7, wherein said target pressure is below said dynamic pressure downstream from said pressure control valve.

* * * * *